(12) United States Patent
Hellring et al.

(10) Patent No.: US 11,532,820 B2
(45) Date of Patent: Dec. 20, 2022

(54) AQUEOUS BINDER COMPOSITION FOR LITHIUM ION ELECTRICAL STORAGE DEVICES

(71) Applicant: PPG INDUSTRIES OHIO, INC., Cleveland, OH (US)

(72) Inventors: Stuart D. Hellring, Pittsburgh, PA (US); Randy E. Daughenbaugh, Monroeville, PA (US); Shanti Swarup, Allison Park, PA (US); Ellor James Van Buskirk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 50 days.

(21) Appl. No.: 16/697,863

(22) Filed: Nov. 27, 2019

(65) Prior Publication Data

US 2020/0099053 A1 Mar. 26, 2020

Related U.S. Application Data

(63) Continuation of application No. 14/242,162, filed on Apr. 1, 2014, now abandoned.

(51) Int. Cl.
| | |
|---|---|
| *H01M 4/62* | (2006.01) |
| *H01M 4/139* | (2010.01) |
| *H01M 4/04* | (2006.01) |
| *C09J 133/06* | (2006.01) |
| *C08L 27/16* | (2006.01) |
| *H01M 4/136* | (2010.01) |
| *H01M 4/66* | (2006.01) |
| *H01M 10/0525* | (2010.01) |
| *H01M 4/131* | (2010.01) |

(52) U.S. Cl.
CPC .......... *H01M 4/623* (2013.01); *C08L 27/16* (2013.01); *C09J 133/06* (2013.01); *H01M 4/0404* (2013.01); *H01M 4/139* (2013.01); *H01M 4/622* (2013.01); *C08L 2201/50* (2013.01); *H01M 4/131* (2013.01); *H01M 4/136* (2013.01); *H01M 4/625* (2013.01); *H01M 4/661* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 4,022,737 | A | * | 5/1977 | Sekmakas .......... C08J 3/03 524/376 |
| 4,039,497 | A | | 8/1977 | Troussier et al. |
| 4,309,328 | A | | 1/1982 | Carson et al. |
| 4,314,004 | A | | 2/1982 | Stoneberg |
| 4,379,885 | A | | 4/1983 | Miller et al. |
| 4,383,075 | A | | 5/1983 | Abel |
| 5,349,003 | A | | 9/1994 | Kato et al. |
| 5,464,897 | A | | 11/1995 | Das et al. |
| 5,595,841 | A | | 1/1997 | Suzuki |
| 5,776,637 | A | | 7/1998 | Kashio et al. |
| 6,159,635 | A | | 12/2000 | Dasgupta et al. |
| 6,231,626 | B1 | | 5/2001 | Yoshida et al. |
| 6,248,468 | B1 | * | 6/2001 | Ruka .................. H01M 4/9066 429/488 |
| 6,294,290 | B1 | | 9/2001 | Kim |
| 6,652,773 | B2 | * | 11/2003 | Maeda .................. H01M 4/62 252/181.1 |
| 6,656,633 | B2 | | 12/2003 | Yamakawa et al. |
| 6,756,153 | B1 | | 6/2004 | Yamamoto et al. |
| 6,770,397 | B1 | | 8/2004 | Maeda et al. |
| 6,881,517 | B1 | | 4/2005 | Kanzaki et al. |
| 7,282,528 | B2 | | 10/2007 | Asano et al. |
| 7,316,864 | B2 | | 1/2008 | Nakayama |
| 7,351,498 | B2 | | 4/2008 | Watarai et al. |
| 7,625,973 | B2 | | 12/2009 | Ambrose et al. |
| 7,659,335 | B2 | | 2/2010 | Konabe |
| 7,758,998 | B2 | | 7/2010 | Ohata et al. |
| 7,820,328 | B1 | | 10/2010 | Takeuchi et al. |
| 7,931,985 | B1 | | 4/2011 | Muthu et al. |
| 7,951,491 | B2 | | 5/2011 | Tokunaga et al. |
| 7,956,144 | B2 | | 6/2011 | Lindow et al. |
| 7,981,543 | B2 | | 7/2011 | Kim et al. |
| 8,093,327 | B2 | | 1/2012 | Ambrose et al. |
| 8,277,977 | B2 | | 10/2012 | Tsuchiya et al. |
| 8,564,933 | B2 | | 10/2013 | Sasaki |
| 2005/0221186 | A1 | | 10/2005 | Shimizu et al. |
| 2008/0038447 | A1 | | 2/2008 | Tu |
| 2008/0264864 | A1 | | 10/2008 | Dadalas et al. |
| 2009/0318618 | A1 | | 12/2009 | Mori et al. |
| 2010/0304270 | A1 | * | 12/2010 | Amin-Sanayei .... H01M 10/052 429/483 |
| 2011/0067230 | A1 | | 3/2011 | Tan |
| 2011/0143198 | A1 | | 6/2011 | Choi |
| 2012/0015246 | A1 | | 1/2012 | Amin-Sanayei et al. |
| 2012/0177991 | A1 | | 7/2012 | Mogi et al. |
| 2012/0309892 | A1 | | 12/2012 | Ootsuka et al. |
| 2013/0034651 | A1 | | 2/2013 | Buqa |
| 2013/0052530 | A1 | | 2/2013 | Kitaguchi et al. |
| 2013/0209875 | A1 | | 8/2013 | Maegawa et al. |
| 2013/0260241 | A1 | | 10/2013 | Sone et al. |

FOREIGN PATENT DOCUMENTS

| | | |
|---|---|---|
| EP | 0057813 A2 | 8/1982 |
| EP | 0483887 A2 | 5/1992 |

(Continued)

*Primary Examiner* — Zhongqing Wei
(74) *Attorney, Agent, or Firm* — Charles M. Yeomans; Ashley N. Crane

(57) ABSTRACT

An electrode binder of a lithium ion secondary battery comprising an aqueous dispersion of: (a) a polyvinylidene binder; (b) a (meth)acrylic polymer dispersant; (c) a cross-linking agent comprising an aminoplast and/or a polycarbodiimide; and (d) an organic diluent. The (meth)acrylic polymer dispersant is prepared from a mixture of monomers comprising one or more carboxylic acid group-containing (meth)acrylic monomers and one or more hydroxyl group-containing (meth)acrylic monomers, and carboxylic acid groups on the (meth)acrylic polymer dispersant are at least partially neutralized with a base. The binder can be used in the assembly of electrodes of lithium ion secondary batteries.

21 Claims, No Drawings

(56) References Cited

FOREIGN PATENT DOCUMENTS

| | | | |
|---|---|---|---|
| EP | 0533641 A2 | 3/1993 | |
| EP | 2555293 A1 | 2/2013 | |
| EP | 2621005 A1 * | 7/2013 | ............. H01G 11/38 |
| EP | 2621005 A1 | 7/2013 | |
| JP | 2000-3727 | 1/2000 | |
| JP | 2000-357505 A | 12/2000 | |
| WO | WO-2012039366 A1 * | 3/2012 | .......... H01M 4/0404 |
| WO | WO 2012039366 A1 | 3/2012 | |
| WO | WO 2013/010936 A1 | 1/2013 | |

\* cited by examiner

AQUEOUS BINDER COMPOSITION FOR LITHIUM ION ELECTRICAL STORAGE DEVICES

CROSS REFERENCE TO RELATED APPLICATIONS

This application is a continuation of U.S. patent application Ser. No. 14/242,162 entitled "AQUEOUS BINDER COMPOSITION FOR LITHIUM ION ELECTRICAL STORAGE DEVICES", filed Apr. 1, 2014, and published as Publication Number 2015-0280239 which is incorporated herein by reference in its entirety.

FIELD OF THE INVENTION

The invention relates to an aqueous fluoropolymer, and preferably polyvinylidene fluoride (PVDF), compositions for manufacturing electrodes for use in electrical storage devices, such as batteries. The composition contains PVDF, binder, water and one or more electrode-forming materials.

BACKGROUND OF THE INVENTION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight.

Polyvinylidene fluoride, because of its excellent electrochemical resistance, has been found to be a useful binder for forming electrodes to be used in electrical storage devices. Typically, the polyvinylidene is dissolved in an organic solvent and the electrode material, that is, the electrically active lithium compound and a carbonaceous material, is combined with the PVDF solution to form a slurry that is applied to a metal foil or mesh to form the electrode.

The role of the organic solvent is to dissolve PVDF in order to provide good adhesion between the electrode material particles and the metal foil or mesh upon evaporation of the organic solvent. Currently, the organic solvent of choice is N-methyl-2-pyrrolidone (NMP). PVDF binders dissolved in NMP provide superior adhesion and an interconnectivity of all the active ingredients in the electrode composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between particles.

Unfortunately, NMP is a toxic material and presents health and environmental issues. It would be desirable to replace NMP as a solvent for PVDF binders. However, NMP is somewhat unique in its ability to dissolve PVDF that is not nearly as soluble in other organic solvents.

Further, the organic-solvent-based slurry presents safety, health and environmental dangers. Many organic solvents are toxic and flammable, volatile in nature, and involve special manufacturing controls to mitigate risk and reduce environmental pollution. It would be desirable to have an aqueous system for dispersing the PVDF and other electrode-forming components.

To effectively employ aqueous PVDF compositions in electrode-forming processes, it is important to develop binder systems that are compatible with current manufacturing practices and provide desired properties of the intermediate and final products. Some common criteria include: a) stability of the aqueous fluoropolymer dispersion, having sufficient shelf-life, b) stability of the slurry after admixing the electroconductive powders, c) appropriate viscosity of the slurry to facilitate good application properties, and d) sufficient interconnectivity within the electrode.

In addition, after the electrodes are assembled in an electrical storage device, the device should be free of moisture and free of hydrophilic groups that may attract moisture.

Surprisingly, a stable, aqueous slurries have now been found for producing high quality electrodes for batteries and other electrical storage devices having interconnectivity. The slurry contains one or more fluoropolymers, preferably PVDF, powder electrode materials such as electrically active lithium metal compounds and carbonaceous material dispersed in aqueous medium with a (meth)acrylic polymer dispersant. The electrodes are is useful in an electrical storage device such as a lithium ion secondary battery.

SUMMARY OF THE INVENTION

The present invention provides an electrode binder of a lithium ion secondary battery comprising an aqueous dispersion of:
(a) a polyvinylidene fluoride polymer;
(b) a (meth)acrylic polymer dispersant;
(c) a crosslinking agent comprising an aminoplast and/or a polycarbodiimides; and
(d) an organic diluent. The (meth)acrylic polymer dispersant is prepared from a mixture of monomers comprising one or more carboxylic acid group-containing (meth)acrylic monomers and one or more hydroxyl group-containing (meth)acrylic monomers, and carboxylic acid groups on the (meth)acrylic polymer dispersant are at least partially neutralized with a base.

The invention also provides an electrode slurry for a lithium ion secondary battery comprising:
(a) an electrically active material capable of lithium intercalation/deintercalation,
(b) the above-described binder,
(c) a conductive agent, and
(d) a thickener.

The invention further provides an electrode comprising:
(a) an electrical current collector;
(b) a cured film formed on the collector (a) comprising:
  (i) a polyvinylidene fluoride polymer,
  (ii) a crosslinked (meth)acrylic polymer formed from the electrode binder described above,
  (iii) a conductive material,
  (iv) an electrode active material capable of lithium intercalation/deintercalation, and
  (v) a thickener.

The invention also provides an electrical storage device comprising:
(a) the above-described electrode,
(b) a counter electrode, and
(c) an electrolyte.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refer to one or more of these components.

When referring to any numerical range of values, such ranges are understood to include each and every number and/or fraction between the stated range minimum and maximum.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

The "vinylidene fluoride polymer" (PVDF) used herein includes both normally high molecular weight homopolymers, copolymers, and terpolymers within its meaning. Such copolymers include those containing at least 50 mole percent, such as at least 75 mole %, and at least 80 mole %, and at least 85 mole % of vinylidene fluoride that may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride.

The PVDF is typically a high molecular weight polymer having a weight average molecular weight of at least 50,000, such as at least 100,000 typically from 100,000 to 1,000,000. PVDF is commercially available from Arkema under the trademark KYNAR.

The (meth)acrylic polymer dispersant is prepared by polymerizing a mixture of alpha, beta-ethylenically unsaturated (meth)acrylic monomers which includes an alpha, beta-ethylenically unsaturated carboxylic acid and at least one other different copolymerizable ethylenically unsaturated monomer such as a copolymerizable ethylenically unsaturated monomer containing hydroxyl groups.

Generally, the alpha, beta-ethylenically unsaturated carboxylic acid constitutes from 2 to 50, more preferably 2 to 20 percent by weight of the polymeric product; the percentage being based on total weight of polymerizable monomers used in preparing the polymeric product.

Examples of alpha, beta-ethylenically unsaturated carboxylic acids are those containing up to 10 carbon atoms such as acrylic acid and methacrylic acid. Examples of other unsaturated acids are alpha, beta-ethylenically unsaturated dicarboxylic acids such as maleic acid or its anhydride, fumaric acid and itaconic acid. Also, the half esters of these dicarboxylic acids may be employed.

Examples of alpha, beta-ethylenically unsaturated monomers, which are different from and are copolymerizable with the alpha, beta-ethylenically unsaturated carboxylic acids mentioned above, are alkyl esters of (meth)acrylic acid containing from 1 to 3 carbon atoms in the alkyl group such as methyl methacrylate. These monomers can be used in amounts up to 98 percent by weight, typically 30 to 96 percent by weight, such as 30-90 percent by weight based on total monomer weight.

Examples of other alpha, beta-ethylenically unsaturated copolymerizable monomers are 4-18 carbon alkyl (meth)acrylates. Specific examples of suitable unsaturated monomers of this type include butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. These monomers can be used in amounts up to up to 70 percent by weight, typically 2 to 60 percent by weight based on total monomer weight.

Besides the alkyl esters of alpha, beta-ethylenically unsaturated carboxylic acids mentioned above, substituted alkyl esters, for example, hydroxyalkyl esters such as hydroxyethyl and hydroxypropyl (meth)acrylate can also be used. These monomers can be used in amounts up to 30 percent by weight, typically at least 2 percent by weight, such as 2 to 20 percent by weight based on total monomer weight.

Hydroxyalky esters are usually present when the binder composition contains a separately added crosslinking agent that is reactive with carboxylic acid and/or hydroxyl groups such as an aminoplast, polycarbodiimide, polyepoxide and blocked polyisocyanate or crosslinking agents using self-crosslinking monomers that are reactive with carboxylic acid and/or hydroxyl groups or with themselves such as N-alkoxyamide groups that are associated with N-alkoxy (meth)acrylamide monomers. Examples of such monomers are N-butoxymethyl (meth)acrylamide and N-isopropoxymethyl (meth)acrylamide. Also, crosslinking monomers containing blocked isocyanate groups can be used. Examples of such monomers include isocyanatoethyl (meth)acrylate in which the isocyanato group is reacted ("blocked") with a compound that unblocks at curing temperature. Examples of suitable blocking agents include epsilon-caprolactone and methylethyl ketoxime. The crosslinking monomers, if used, are typically present in amounts up to 30 percent by weight, such as 2 to 20 percent by weight based on total monomer weight.

Examples of other alpha, beta-ethylenically unsaturated monomers are vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide and monomeric dienes such as 1,3-butadiene and 2-methyl-1,3-butadiene. These monomers, if present, are present in amounts of up to 30 percent by weight, such as 2 to 20 percent by weight based on total monomer weight.

The monomers and relative amounts are selected such that the resulting (meth)acrylic polymer has a Tg of 100° C. or less, typically from −50 to +70° C.

Acid group-containing acrylic polymers are usually prepared by conventional free radical initiated solution polymerization techniques in which the polymerizable monomers are dissolved in a solvent or a mixture of solvents and polymerized in the presence of a free radical initiator until conversion is complete.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary-amyl peroctoate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

To prepare the acid group-containing acrylic polymer, the solvent is first heated to reflux and the mixture of polymerizable monomers containing the free radical initiator is added slowly to the refluxing solvent. The reaction mixture is held at polymerizing temperatures so as to reduce the free monomer content to below 1.0 and usually below 0.5 percent.

For use in the process of the invention, the acid group-containing acrylic polymers prepared as described above should preferably have a weight average molecular weight of about 5000 to 500,000, such as 10,000 to 100,000, and 25,000 to 50,000.

The acid group-containing acrylic polymer is treated with a base to form a water-dispersible salt thereof. Examples of suitable bases are organic bases such as amines and inorganic bases such as sodium and potassium hydroxides, lithium hydroxide and lithium carbonate. Examples of suitable amines are water-soluble amines including ammonia, primary, secondary and tertiary amines including hydroxyalkyl amines. Examples include ethanolamine, diethanolamine, N-methylethanolamine, dimethylethanolamine, methylamine, ethylamine, diethylamine, trimethylamine, triethylamine and morpholine. The acid group-containing polymer is at least partially neutralized, usually to the extent of at least 20 and more usually at least 40 percent of the total theoretical neutralization.

After the acid group-containing acrylic polymer has been treated with a base, it is dispersed in aqueous medium. The step of dispersion is accomplished by combining the neutralized or partially neutralized polymer with the aqueous medium. Neutralization and dispersion can be accomplished in one step by combining the acid group-containing acrylic polymer and aqueous medium which contains the base. The polymer (or its salt) can be added to the aqueous medium or the aqueous medium added to the polymer (or its salt). The pH of the dispersion is preferably within the range of 7.0 to 9.0.

The aqueous dispersion can be treated by dialysis or ultrafiltration to remove low molecular weight material such as emulsifiers or surfactants and excess base. Such treatments can improve electrical storage device properties.

The neutralized or partially neutralized acid group-containing (meth)acrylic polymer serves as a dispersant for a PVDF. Typically, the PVDF is added to the aqueous medium containing the (meth)acrylic polymer dispersant with low shear mixing to form the electrode binder.

Besides the PVDF and the (meth)acrylic polymer dispersant, the electrode binder can also contain a separately added crosslinking agent for the (meth)acrylic polymer dispersant. The crosslinking agent should be soluble or dispersible with water and be reactive with the carboxylic acid groups and the hydroxyl groups, if present, associated with the (meth) acrylic polymer. Suitable crosslinking agents are aminoplast resins, polycarbodiimides, blocked polyisocyanates and polyepoxides.

Examples of aminoplast resins are those which are formed by reacting a triazine such as melamine or benzoguanamine with formaldehyde. These reaction products contain reactive N-methylol groups. Preferably, these reactive groups are etherified typically with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark RESIMENE from Ineos.

Suitable carbodiimide crosslinkers include an aliphatic and/or cycloaliphatic dinitrogen analogue of carbonic acid of the generalized structure: $RN=C=NR_1$ where R and $R_1$ are independently aliphatic or cycloaliphatic groups. The aliphatic groups can comprise 1-6 carbon atoms. Examples include dibutyl carbodiimide and dicyclohexyl carbodiimide. Oligomeric or polymeric carbodiimide crosslinkers can also be used. Examples of such materials are those available from Nisshinbo Chemical, Inc. under the trademark CARBODILITE.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactone and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Bayer as DESMODUR BL.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

Crosslinking agents, including those associated with the crosslinking monomer and separately added crosslinking agent, are desirable because they react with the hydrophilic, carboxylic acid and/or hydroxyl groups preventing these groups from absorbing moisture that would be problematic in a lithium ion secondary battery.

As mentioned above, the electrode binder is typically prepared by adding the PVDF to the aqueous medium containing the (meth)acrylic polymer dispersant and the crosslinking agent, if present, with low shear mixing until a stable dispersion is formed. The dispersion typically has a resin solids content of from 30 to 80, usually 40 to 70 percent by weight. The PVDF is usually present in the dispersion in amounts of 45 to 96, typically 50 to 90 percent by weight; the (meth)acrylic polymer dispersant is usually present in amounts of 2 to 20, typically 5 to 15 percent by weight, and the separately added crosslinker is usually present in amounts of up to 15, typically 1 to 15 percent by weight, the percentage by weight being based on weight of resin solids.

The water content of the binder dispersion is typically from 20 to 80, usually 30 to 70 percent by weight based on total weight of the dispersion.

An organic diluent can be present in the binder composition in amounts up to 40 such as 10 to 30 percent by weight based on total weight of the dispersion. Examples of organic diluents include ketones such as methyl ethyl ketone, cyclohexanone, isophorone, acetophenone; carbonates such as propylene carbonate, alcohols such as ethanol and butanol, glycols such as ethylene and propylene glycol and ethers such as $C_1$ to $C_6$ alkyl ethers of ethylene and propylene glycol.

To prepare an electrode for a lithium ion electrical storage device, an electrically active material capable of lithium ion intercalation (deintercalation), a conductive agent and optional ingredients are combined to form a slurry. During discharge, lithium ions are released from the negative electrode and carry the current to the positive electrode in a process known as deintercalation. During charging, the lithium ions migrate from the positive electrode to the negative electrode where they become embedded in the electrode in a process known as intercalation.

The material constituting the active material particles contained in the electrode slurry is not particularly limited and a suitable material can be selected according to the type of an electrical storage device of interest. However, the active material particles contained in the electrode slurry which is manufactured by using the binder composition for positive electrodes of the present invention are typically electrically active lithium compounds capable of lithium intercalation/deintercalation. Examples are lithium atom-containing oxides and phosphates such as $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and mixtures thereof.

The electrically active lithium compound is usually present in the slurry in amounts of 45 to 95, typically 50 to 90 percent by weight based on solids weight of the slurry.

The electrode slurry contains other components as required in addition to the above components. The other components include a conductivity providing agent and a thickener and optionally an organic solvent.

Examples of the above conductivity providing agent include carbonaceous materials. Examples of the carbonaceous materials include graphite, activated carbon, acetylene black, furnace black, graphite, carbon fibers and fullerene. Out of these, acetylene black or furnace black can be used. The conductivity providing agent is usually present in the slurry in amounts of 2 to 20, typically 5 to 10 percent by weight based on solids weight of the slurry.

The electrode slurry contains a thickener to prevent settling of the solids while providing appropriate slurry viscosity for coating the current collector. Examples of the thickener include cellulose compounds such as carboxymethyl cellulose, methyl cellulose and hydroxypropyl cellulose; ammonium salts and alkali metal salts of the above cellulose compounds; polycarboxylic acids such as poly(meth)acrylic acid and modified poly(meth)acrylic acid; alkali metal salts of the above polycarboxylic acids; polyvinyl alcohol-based (co)polymers such as polyvinyl alcohol, modified polyvinyl alcohol and ethylene-vinyl alcohol copolymer; water-soluble polymers such as saponified products of a copolymer of an unsaturated carboxylic acid such as (meth)acrylic acid, maleic acid or fumaric acid and a vinyl ester and anionic (meth)acrylic polymer thickeners.

Commercially available products of these thickeners include CMC1120, CMC1150, CMC2200, CMC2280 and CMC2450 (of Daicel Chemical Industries, Ltd.) as alkali metal salts of carboxymethyl cellulose and ACRYSOL ASE 60 and 75 anionic (meth)acrylic polymer thickeners from Dow.

The content of the thickener is usually not more than 20 wt %, typically 0.1 to 15 wt %, such as 0.5 to 10 wt % based on the total solids content of the electrode slurry.

Water is typically present in the electrode slurry in an amount of 1 to 30, such as 2 to 20 percent by weight based on total weight of the slurry.

The electrode slurry may contain an organic diluent to improve the stability and coatability of the slurry. Examples of the organic diluent include ketones such as methyl ethyl ketone, cyclohexanone, isophorone, acetophenone; and ethers such as $C_1$ to $C_4$ alkyl ethers of ethylene and propylene glycol. When present, the organic diluent is present in amounts up to 60 percent, typically 2 to 50 percent by weight based on total weight of the slurry.

The electrode slurry can be manufactured by mixing together the electrically active lithium compound, the binder including crosslinker, the conductive material, the thickener, additional water if necessary, and optional additives. These substances can be mixed together by agitation with a known means such as stirrer, bead mill or high-pressure homogenizer.

As for mixing and agitation for the manufacture of the electrode slurry, a mixer capable of stirring these components to such an extent that an agglomerate of the active material particles does not remain in the slurry as well as necessary and satisfactory dispersion conditions must be selected. The degree of dispersion can be measured with a particle gauge, and mixing and dispersion are preferably carried out to ensure that agglomerates of 100 millimicrons or more are not present. Examples of the mixer which meets this condition include ball mill, sand mill, pigment disperser, grinding machine, ultrasonic disperser, homogenizer, planetary mixer and Hobart mixer.

The electrode can be manufactured by applying the above slurry to the surface of a suitable current collector such as metal foil or mesh to form a coating film and curing the coating film.

The current collector is not particularly limited if it is made of a conductive material. In a lithium ion secondary battery, a current collector made of a metal such as iron, copper, aluminum, nickel or stainless steel is used. Typically, aluminum or copper in sheet or mesh form is used.

Although the shape and thickness of the current collector are not particularly limited, the current collector is preferably like a sheet having a thickness of about 0.001 to 0.5 mm.

The method of applying the slurry to the current collector is not particularly limited. The slurry may be applied by doctor blade coating, dip coating, reverse roll coating, direct roll coating, gravure coating, extrusion coating, immersion or brushing. Although the application quantity of the slurry is not particularly limited, the thickness of the active material layer formed after the liquid medium is removed is typically 25 to 150 microns (μm), such as 30 to 125 μm.

The method of curing or crosslinking the coating film after application can be done by heating at elevated temperature, such as at least 150° C., for example, at least 200° C., such as 225-300° C. The time of heating will depend somewhat on the temperature. Generally, higher temperatures require less time for curing. Typically, curing times are for at least 15 minutes, such as 15 to 60 minutes. The curing temperature and time should be sufficient such that the (meth)acrylic polymer in the cured film is crosslinked, that is, covalent bond are formed between coreactive groups on the (meth)acrylic polymer chain, such as the carboxylic acid groups and the hydroxyl groups and the N-methylol and/or the N-methylol ether groups of the aminoplast, or in the case of a self-curing (meth)acrylic polymer, the N-alkoxymethyl amide groups. The extent of cure or crosslinking is typically measured as resistance to solvents such as methyl ethyl ketone (MEK). The test is performed as described in ASTM D-540293. The number of double rubs, one back and forth motion, is reported. This test is often referred to as "MEK Resistance". Accordingly, the (meth)acrylic polymer and crosslinking agent (inclusive of self-curing (meth)acrylic polymers and (meth)acrylic polymers with separately added crosslinking agents) is isolated from the binder composition, deposited as a film and heated for the temperature and time that the binder film is heated. The crosslinked film is measured for MEK Resistance. Accordingly, a crosslinked (meth)acrylic polymer will have an MEK Resistance of at least 50, typically at least 75 double rubs. Also, the crosslinked (meth)acrylic polymer is solvent resistant to the solvents of the electrolyte mentioned below.

An electrical storage device can be manufactured by using the above electrodes. The electrical storage device, such as a battery, contains an electrolytic solution and can be manufactured by using parts such as a separator in accordance with a commonly used method. As a more specific manufacturing method, a negative electrode and a positive electrode are assembled together with a separator therebetween, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material.

The electrolytic solution may be a solution containing an electrolyte dissolved in a suitable solvent.

As the above electrolyte may be used a conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$.

The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide.

The concentration of the electrolyte in the electrolytic solution is preferably 0.5 to 3.0 mole/L, more preferably 0.7 to 2.0 mole/L.

In the case of the counter electrode, the active material is generally a carbonaceous material as described above or other matrix material capable of being doped with lithium ions. The counter electrode is generally prepared as described above.

EXAMPLES

Illustrating the invention are the following examples that are not to be construed as limiting the invention to their details. All parts and percentages in the Examples as well as throughout the specification are by weight unless otherwise indicated.

In the following Examples, Examples 1-2 show the synthesis of (meth)acrylic polymers that were used to disperse various polyvinylidene fluoride (PVDF) polymers in aqueous medium.

Examples 3-5 show PVDF binder dispersions prepared with the (meth)acrylic polymer dispersants of Examples 1 and 2.

Examples 7-13 show the preparation of aqueous slurries prepared with the PVDF binder dispersions of Examples 3-5, conductive carbon, electrically active lithium compound, and aminoplast. The Examples also show application of the slurries to a current collector serving as a positive electrode in a lithium ion battery.

Example 6 (comparative) shows a conventional binder of PVDF dissolved in N-methyl-2-pyrrolidone.

Example 14 (comparative) shows the preparation of a slurry prepared with the PVDF binder of Example 6 and the application of the slurry to a current collector serving as a positive electrode in a lithium ion battery.

Example 1

A (meth)acrylic polymer with a theoretical glass transition temperature (Tg) of 69° C. was prepared as follows:

|  | Ingredients | Amount (gram) |
| --- | --- | --- |
| Charge 1: | methylether of propylene glycol | 93 |
| Charge 2: | tertiary-amyl peroctoate | 2.2 |
| (premixed) | methylether of propylene glycol | 39 |
| Charge 3: | methyl methacrylate | 165 |
| (premixed) | ethyl acrylate | 49 |
|  | methacrylic acid | 9 |
| Charge 4: | methylether of propylene glycol | 11.1 |
| Charge 5: | tertiary-amyl peroctoate | 0.7 |
| (premixed) | methylether of propylene glycol | 11.7 |
| Charge 6: | methylether of propylene glycol | 5.5 |
| Charge 7: | Dimethyl ethanol amine | 10.1 |
| Charge 8: | 70° C. Deionized water | 423 |

To a suitable reaction vessel equipped with a stirrer, reflux condenser, thermometer, heating mantle and nitrogen inlet, Charge 1 was added at ambient temperatures. The temperature was then increased to reflux (~120° C.), at which time the initiator premix of Charge 2 was added over 185 minutes. Five (5) minutes after the start of Charge 2, Charge 3 was added over 180 minutes. Upon completion of Charges 2 and 3, Charge 4 was added, followed by a hold for additional 60 minutes at reflux (~120° C.). Charge 5 was then added over 30 minutes, followed by Charge 6 and an additional 90 minute hold at reflux. After cooling to below 110° C., Charge 7 was added over 10 minutes and stirring was continued for 15 minutes before Charge 8 was added over 60 minutes. Thereafter the reaction temperature was cooled to 40° C. The polymeric product thus formed had a theoretical solids of 29%.

Example 2

This polymer was prepared the same way as the polymer of Example 1 except methylether of propylene glycol was replaced by diacetone alcohol and dimethyl ethanol amine was replaced by sodium hydroxide.

Example 3

In a 2 liter plastic container, was placed 115.3 grams of deionized water, 319.5 grams of (meth)acrylic copolymer from Example 1, and 0.77 grams of Drewplus Y-281 defoamer. The resultant mixture was stirred vigorously using a Cowles blade while maintaining a modest vortex. This mixing was continued while 244.7 grams of polyvinylidene difluoride powder, PG-11 (Arkema) was added in small portions. Mixing was continued for an additional 30 minutes after all the polyvinylidene difluoride powder was added.

Examples 4-5

By similar procedures, as shown in Table 1 below, PVDF dispersions were prepared from combinations of (meth)acrylic copolymer and PVDF and Resimene HM-2608 melamine-type crosslinker from Ineos in a 25/70/5 weight ratio respectively, where Resimene HM-2608 was mixed in at the end of the initial dispersion:

TABLE 1

Dispersion Details for Examples 4 and 5

| Example | (Meth)acrylic Copolymer | Polyvinylidene Difluoride |
| --- | --- | --- |
| Example 4 | Example 1 | Kynar HSV 900 |
| Example 5 | Example 2 | Kynar HSV 900 |

Example 6 (Comparative)

To a plastic container was added solvent grade N-methyl-2-pyrrolidone (Ashland, 570.7 grams). While stirring with a Cowles blade, polyvinylidene difluoride, Kynar HSV 900 PVDF (Arkema, 29.3 grams) was added in portions. Stirring was continued until the polymer was completely dissolved.

Example 7

To a small plastic mixing cup was added 5.55 grams of ethanol, 56 grams of DI water, and 0.5 grams of sodium carboxymethylcellulose. After mixing to a clear solution, 2.0 grams of Timcal C-NERGY™ Super C65 conductive carbon was added. This blend was placed in a dual-asymmetric centrifugal mixer and mixed at 2350 rpm for 5 minutes. Cathode active powder lithium iron phosphate (LFP) (22.6 grams) was added to this mixed blend, and the resulting combination was subjected to a second mixing in a dual-asymmetric centrifugal mixer at 2350 rpm for 5 minutes. Next, 2.74 grams of binder from Example 3 and 0.14 grams of the HM-2608 was added and the combination was subjected to a third mixing in a dual-asymmetric centrifugal mixer at 2350 rpm for 5 minutes. And finally, 10 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 43 microns was determined from five measurements with a micrometer.

Battery performance data for this coating is shown in Table 3.

Example 8

To a small plastic mixing cup was added 5.55 grams of ethanol, 56 grams of DI water, and 0.5 grams of sodium carboxymethylcellulose. After mixing to a clear solution, 2.0 grams of Super C65 was added. This blend was placed in a dual-asymmetric centrifugal mixer and mixed at 2350 rpm for 5 minutes. LFP (22.6 grams) was added to this mixed blend, and the resulting combination was subjected to a second mixing in a dual-asymmetric centrifugal mixer at 2350 rpm for 5 minutes. Next, 2.74 grams of binder from Example 3 and 0.14 grams of the HM-2608 was added and the combination was subjected to a third mixing in a dual-asymmetric centrifugal mixer at 2350 rpm for 5 minutes. And finally, 10 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 246° C. for at least 10 minutes. After cooling, an average dry film thickness of 43 microns was determined from five measurements with a micrometer.

Battery performance data for this coating is shown in Table 3.

Example 9

To a small plastic mixing cup was added 3.9 grams of ethanol, 39.2 grams of DI water, and 0.35 grams of sodium carboxymethylcellulose. After mixing to a clear solution, 1.4 grams of Super C65 was added. This blend was placed in a dual-asymmetric centrifugal mixer and mixed at 2350 rpm for 5 minutes. LFP (15.88 grams) was added to this mixed blend, and the resulting combination was subjected to a second mixing in a dual-asymmetric centrifugal mixer at 2350 rpm for 5 minutes. Next, 2.09 grams of binder from Example 3 and the combination was subjected to a third mixing in a dual-asymmetric centrifugal mixer at 2350 rpm for 5 minutes. And finally, 7 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 50 microns was determined from five measurements with a micrometer.

Battery performance data for this coating is shown in Table 3.

Example 10

To a small plastic mixing cup was added 3.04 grams of ethanol, 30.4 grams of DI water, and 11.2 grams of sodium hydroxide neutralized Acrysol ASE-60 (anionic thickener from Dow). After mixing to a clear solution, 1.37 grams of Super C65 was added. This blend was placed in a dual-asymmetric centrifugal mixer and mixed at 2350 rpm for 5 minutes. LFP (15.5 grams) was added to this mixed blend, and the resulting combination was subjected to a second mixing in a dual-asymmetric centrifugal mixer at 2350 rpm for 5 minutes. Next, 2.32 grams of binder from Example 3 and 0.08 grams of the HM-2608 was added and the combination was subjected to a third mixing in a dual-asymmetric centrifugal mixer at 2350 rpm for 5 minutes. And finally, 6.08 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 45 microns was determined from five measurements with a micrometer.

Battery performance data for this coating is shown in Table 3.

Example 11

To a small plastic mixing cup was added 3.9 grams of ethanol, 39.2 grams of DI water, and 0.35 grams of sodium carboxymethylcellulose. After mixing to a clear solution, 1.4 grams of Super C65 was added. This blend was placed in a dual-asymmetric centrifugal mixer and mixed at 2350 rpm for 5 minutes. LFP (15.88 grams) was added to this mixed blend, and the resulting combination was subjected to a second mixing in a dual-asymmetric centrifugal mixer at 2350 rpm for 5 minutes. Next, 2.2 grams of binder from Example 4 and the combination was subjected to a third mixing in a dual-asymmetric centrifugal mixer at 2350 rpm for 5 minutes. And finally, 7 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 55 microns was determined from five measurements with a micrometer.

Battery performance data for this coating is shown in Table 3.

Example 12

To a small plastic mixing cup was added 3.9 grams of ethanol, 39.2 grams of DI water, and 0.35 grams of sodium carboxymethylcellulose. After mixing to a clear solution, 1.4 grams of Super C65 was added. This blend was placed in a dual-asymmetric centrifugal mixer and mixed at 2350 rpm for 5 minutes. LFP (15.88 grams) was added to this mixed blend, and the resulting combination was subjected to a second mixing in a dual-asymmetric centrifugal mixer at 2350 rpm for 5 minutes. Next, 2.1 grams of binder from Example 5 and the combination was subjected to a third mixing in a dual-asymmetric centrifugal mixer at 2350 rpm for 5 minutes. And finally, 7 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 50 microns was determined from five measurements with a micrometer.

Battery performance data for this coating is shown in Table 3.

Example 13

To a small plastic mixing cup was added 2.6 grams of ethanol, 26 grams of DI water, and 9.58 grams of sodium hydroxide neutralized Acrysol ASE-60. After mixing to a clear solution, 1.17 grams of Super C65 was added. This blend was placed in a dual-asymmetric centrifugal mixer and mixed at 2350 rpm for 5 minutes. LFP (13.27 grams) was added to this mixed blend, and the resulting combination was subjected to a second mixing in a dual-asymmetric centrifugal mixer at 2350 rpm for 5 minutes. Next, 2.11 grams of binder from Example 5 and the combination was subjected to a third mixing in a dual-asymmetric centrifugal mixer at 2350 rpm for 5 minutes. And finally, 5.2 grams of 2-butoxyethanol solvent was added and the mixture was mixed on a dual-asymmetric centrifugal mixer at 2350 rpm for 5 minutes for the final time.

A wet film was prepared on pre-cleaned aluminum foil by a draw-down application of this formulated slurry using a doctor blade. This wet film was heated in an oven to a maximum temperature of 190° C. for at least 10 minutes. After cooling, an average dry film thickness of 48 microns was determined from five measurements with a micrometer.

Battery performance data for this coating is shown in Table 3.

Example 14

To a plastic cup was added NMP (15.7 grams), binder solution from Example 6 (27.66 grams) and Super C65 (1.35 grams). This blend was placed in a dual-asymmetric centrifugal mixer and mixed at 2350 rpm for 5 minutes. LFP (15.3 grams) was added to this mixed blend, and the resulting combination was subjected to a second mixing in a dual-asymmetric centrifugal mixer at 2350 rpm for 5 minutes to produce formulated slurry.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 44 microns was determined from five measurements with a micrometer.

Battery performance data for this coating is shown in Table 3.

Table 2 below summarizes the compositions of Examples 7-14.

TABLE 2

Summary of Examples 7-14

| Ex. # | Acrylic Ex. # | PVDF | (Meth)acrylic/PVDF Weight Ratio | (Meth)acrylic/ aminoplast Weight Ratio | (Meth)acrylic/ PVDF/aminoplast Weight Ratio | Total resin solids | Wt % LFP | Wt % Conductive Carbon | Water/organic diluent Weight Ratio | Cure Temp. (° C.) | DFT (μ) |
|---|---|---|---|---|---|---|---|---|---|---|---|
| 7 | 1 | PG11 | 30/70 | 77/23 | 27.5/64.5/8 | 7.5 | 85 | 7.5 | 79/21 | 190 | 43 |
| 8 | 1 | PG11 | 30/70 | 77/23 | 27.5/64.5/8 | 7.5 | 85 | 7.5 | 79/21 | 246 | 43 |
| 9 | 1 | PG11 | 30/70 | none | 30/70/0 | 7.5 | 85 | 7.5 | 79/21 | 190 | 50 |
| 10 | 1 | PG11 | 30/70 | 83/17 | 28/66/6 | 7.5 | 85 | 7.5 | 82.4/17.6 | 190 | 45 |
| 11 | 1 | HSV900 | 26/74 | 83/17 | 25/70/5 | 7.5 | 85 | 7.5 | 79/21 | 190 | 55 |
| 12 | 4 | HSV900 | 26/74 | 83/17 | 25/70/5 | 7.5 | 85 | 7.5 | 79/21 | 190 | 50 |

TABLE 2-continued

Summary of Examples 7-14

| Ex. # | Acrylic Ex. # | PVDF | (Meth)acrylic/PVDF Weight Ratio | (Meth)acrylic/ aminoplast Weight Ratio | (Meth)acrylic/ PVDF/aminoplast Weight Ratio | Total resin solids | Wt % LFP | Wt % Conductive Carbon | Water/organic diluent Weight Ratio | Cure Temp. (° C.) | DFT (μ) |
|---|---|---|---|---|---|---|---|---|---|---|---|
| 13 | 5 | HSV900 | 26/74 | 83/17 | 25/70/5 | 7.5 | 85 | 7.5 | 82.4/17.6 | 190 | 48 |
| 14 | — | HSV900 | — | — | — | 7.5 | 85 | 7.5 | — | 120 | 44 |

Discharge data for coin-cell batteries prepared from Examples. Table 3 shows cell specific capacity (milliamphours per gram) for various discharge C-rates (per hour).

TABLE 3

| | | Discharge C-Rate (hour$^{-1}$) | | | | | | % Capacity Retention after about 50 cycles |
|---|---|---|---|---|---|---|---|---|
| Example | Temperature | 0.2 | 0.4 | 0.8 | 1.6 | 3.2 | 6.4 | 1.0 | at C-rate of 1.0 |
| 7 | 25° C. | 151 | 148 | 141 | 131 | 113 | 82 | 137 | 90.6 |
| 8 | 25° C. | 151 | 148 | 144 | 137 | 124 | 100 | 141 | 91.9 |
| 9 | 25° C. | 154 | — | — | 138 | — | 100 | 142 | 88.4 |
| 10 | 25° C. | 158 | — | — | 143 | — | 109 | 147 | 86.2 |
| 11 | 25° C. | 153 | — | — | 136 | — | 94 | 141 | 94.0 |
| 12 | 25° C. | 151 | — | — | 135 | — | 97 | 140 | 93.5 |
| 13 | 25° C. | 147 | — | — | 131 | — | 89 | 135 | 90.1 |
| 14 | 25° C. | 156 | 154 | 150 | 141 | 119 | 76 | 145 | 88.6 |

The dual-asymmetric centrifugal mixer that was used in the examples above was a model DAC 400.1 FVZ from FlackTec, Inc. or model ARM-310 Thinky USA, Inc. The electrically active lithium compound was lithium iron phosphate Life Power P2 lot #1110GY195 from Phostech Lithium, Inc. Aluminum foil alloy 1085 from Targray was cleaned with acetone before the slurry was applied. Formulations were applied as wet films on the aluminum foil using a large automatic film coater (MSK-AFA-II from MTI Corporation) using an adjustable doctor blade at a rate of 89 mm/sec. Wet coated foils were placed in an oven for battery performance.

The dry coated foils were then passed through a roll calendar press (MTI Corporation) to achieve 25-30% compression. After vacuum drying, two coin-type half-cell batteries per dry coated foil were assembled using lithium metal as the anode and one-molar LiPF6 in ethylene carbonate, diethyl carbonate and dimethyl carbonate solvents as the electrolyte. The coin cell batteries were then tested on a battery tester (Arbin Instruments) using a potential window of 4.1-2.5 Volts for 5 cycles each at currents corresponding to 0.2 C, 0.4 C, 0.8 C, 1.6 C, 3.2 C and 6.4 C charge/discharge rates, followed by 50 cycles at the current corresponding to a 1 C rate. Discharge capacity in milliamp-hours per gram of lithium iron phosphate was calculated from the average of the first 5 cycles for each C-rate. Discharge capacity averages from the higher capacity coin-type half-cell of the two replicate cells for a given dry coated foil are reported in Table 3. Capacity retention was calculated from the quotient of the discharge capacity after the first charge-discharge cycle at 1 C and the last charge-discharge cycle at 1 C and reported as percentage according to the equation: 100×first cycle capacity/last cycle capacity.

Note that "C-rate" refers to a current value that is required to fully discharge a cell having a constant electric capacitance in a time period equal to the inverse of the C-rate value in hours. For example, discharge capacity at 0.2 C refers to dry coated film capacity in milliamp-hours per gram of lithium iron phosphate at a current value required to fully discharge the battery in 5 hours. Similarly discharge capacity at 1 C refers to dry coated film capacity in milliamp-hours per gram of lithium iron phosphate at a current value required to fully discharge the battery in 1 hour.

Some observations from the Examples:

1. The PVDF binder dispersed in aqueous medium with the (meth)acrylic binder (Examples 7-13) give good performance comparing favorably with the control. Example 14 is the standard control in which the binder is battery grade PVDF dissolved in N-methyl-2-pyrrolidone.

2. Higher temperature cure gives better performance. Compare Example 8 with Example 7.

3. Examples 10 and 11 show that low and high molecular weight PVDF give equivalent performance.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. An electrode binder of a lithium ion secondary battery comprising an aqueous dispersion of:
   (a) a polyvinylidene fluoride polymer comprising at least 75 mole % of vinylidene fluoride;
   (b) a (meth)acrylic polymer dispersant;
   (c) a crosslinking agent comprising an aminoplast and/or a polycarbodiimide; and
   (d) an organic diluent;
wherein the (meth)acrylic polymer dispersant is prepared from a mixture of monomers consisting of one or more carboxylic acid group-containing (meth)acrylic monomers and at least one different copolymerizable ethylenically unsaturated monomer selected from alkyl esters of (meth)

acrylic acid containing from 1 to 3 carbon atoms in the alkyl group, alkyl esters of (meth)acrylic acid containing from 4 to 18 carbon atoms in the alkyl group, one or more hydroxyl group-containing (meth)acrylic monomers, a self-crosslinking monomer, vinyl aromatic monomers, and monomeric dienes, wherein carboxylic acid groups on the (meth)acrylic polymer dispersant are at least partially neutralized with a base.

2. The electrode binder of claim 1 in which the (meth)acrylic polymer has a glass transition temperature of from −50 to +70° C.

3. The electrode binder of claim 1 in which the base is an amine.

4. The electrode binder of claim 3 in which the amine is a volatile tertiary amine.

5. The electrode binder of claim 1 in which the polyvinylidene fluoride polymer is present in amounts of 50 to 98 percent by weight; the (meth)acrylic polymer is present in amounts of 2 to 50 percent by weight and the crosslinking agent is present in amounts of 2 to 50 percent by weight, the percentages by weight being based on resin solids.

6. The electrode binder of claim 5 which has a resin solids content of 30 to 80 percent by weight.

7. An electrode slurry for a lithium ion secondary battery comprising:
(a) an electrically active material capable of lithium intercalation/deintercalation,
(b) a binder comprising an aqueous dispersion of:
(i) a polyvinylidene fluoride polymer comprising at least 75 mole % of vinylidene fluoride,
(ii) a (meth)acrylic polymer dispersant,
(iii) a crosslinking agent comprising an aminoplast and/or a polycarbodiimide; and
(iv) an organic diluent;
(c) a conductive agent, and
(d) a thickener;
wherein the (meth)acrylic polymer dispersant is prepared from a mixture of monomers consisting of one or more carboxylic acid group-containing (meth)acrylic monomers and at least one different copolymerizable ethylenically unsaturated monomer selected from alkyl esters of (meth)acrylic acid containing from 1 to 3 carbon atoms in the alkyl group, alkyl esters of (meth)acrylic acid containing from 4 to 18 carbon atoms in the alkyl group, one or more hydroxyl group-containing (meth)acrylic monomers, a self-crosslinking monomer, vinyl aromatic monomers, and monomeric dienes, wherein carboxylic acid groups on the (meth)acrylic polymer dispersant are at least partially neutralized with a base.

8. The electrode slurry of claim 7 in which (a) comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or mixtures thereof.

9. The electrode slurry of claim 8 in which (a) is $LiFePO_4$.

10. The electrode slurry of claim 7 in which (c) comprises graphite, activated carbon, acetylene black, furnace black or graphene.

11. The electrode slurry of claim 7 further comprising an organic solvent.

12. The electrode slurry of claim 7 in which
(a) is present in amounts of 45 to 95 percent by weight;
(b) is present in amounts of 2 to 20 percent by weight;
(c) is present in amounts of 2 to 20 percent by weight; and
(d) is present in amounts of 0.1 to 15 percent by weight;
the percentages by weight being based on total solids weight.

13. The electrode slurry of claim 7 in which the (meth)acrylic polymer has a glass transition temperature of from −50 to +70° C.

14. The electrode slurry of claim 7 in which the polyvinylidene fluoride polymer is present in amounts of 50 to 98 percent by weight; the (meth)acrylic polymer is present in amounts of 2 to 50 percent by weight and the crosslinking agent is present in amounts of 2 to 50 percent by weight, the percentages by weight being based on resin solids.

15. The electrode slurry of claim 14 which has a resin solids content of 30 to 80 percent by weight.

16. An electrode comprising:
(a) an electrical current collector;
(b) a cured film formed on the collector (a) comprising:
(i) a polyvinylidene fluoride polymer comprising at least 75 mole % of vinylidene fluoride,
(ii) a crosslinked (meth)acrylic polymer formed from the electrode binder of claim 1,
(iii) a conductive material,
(iv) an electrode active material intercalation/deintercalation, and
(v) a thickener.

17. The electrode of claim 16 in which (a) comprises copper or aluminum sheet or foil.

18. The electrode of claim 16 in which (iii) comprises graphite, activated carbon, acetylene black, furnace black or graphene.

19. The electrode of claim 16 in which (iv) comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or mixtures thereof.

20. An electrical storage device comprising:
(a) an electrode including an electrical current collector and a cured film formed on the collector including:
(i) a polyvinylidene fluoride polymer comprising at least 75 mole % of vinylidene fluoride,
(ii) a crosslinked (meth)acrylic polymer formed from the electrode binder of claim 1,
(iii) a conductive material,
(iv) an electrode active capable of lithium material intercalation/deintercalation, and
(v) a thickener,
(b) a counter electrode, and
(c) an electrolyte.

21. The electrode binder of claim 1, wherein the mixture of monomers is free of organic nitriles.

* * * * *